(12) United States Patent
Seo et al.

(10) Patent No.: US 8,506,443 B2
(45) Date of Patent: Aug. 13, 2013

(54) PLANETARY GEAR TRAIN OF AUTOMATIC TRANSMISSION FOR VEHICLES

(75) Inventors: Kangsoo Seo, Suwon-si (KR); Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/307,655

(22) Filed: Nov. 30, 2011

(65) Prior Publication Data
US 2012/0270694 A1 Oct. 25, 2012

(30) Foreign Application Priority Data
Apr. 21, 2011 (KR) .................. 10-2011-0037384

(51) Int. Cl.
*F16H 3/44* (2006.01)

(52) U.S. Cl.
USPC ........................................................ 475/280

(58) Field of Classification Search
USPC ........................................ 475/271, 296, 330
See application file for complete search history.

(56) References Cited

U.S. PATENT DOCUMENTS

| 6,955,627 | B2* | 10/2005 | Thomas et al. | 475/283 |
| 2007/0129206 | A1* | 6/2007 | Jang | 475/275 |
| 2007/0225109 | A1* | 9/2007 | Jang | 475/280 |
| 2008/0207382 | A1* | 8/2008 | Kato et al. | 475/276 |
| 2008/0207383 | A1* | 8/2008 | Kato et al. | 475/276 |
| 2009/0118058 | A1* | 5/2009 | Suh | 475/275 |
| 2010/0279814 | A1 | 11/2010 | Brehmer et al. | |
| 2011/0045942 | A1 | 2/2011 | Gumpoltsberger et al. | |

FOREIGN PATENT DOCUMENTS

| JP | 2001-82555 A | 3/2001 |
| JP | 2002-130468 A | 5/2002 |
| JP | 2006-349153 A | 12/2006 |
| JP | 2009-162339 A | 7/2009 |
| KR | 10-0931050 B1 | 12/2009 |

* cited by examiner

*Primary Examiner* — David D Le
*Assistant Examiner* — David J Hlavka
(74) *Attorney, Agent, or Firm* — Morgan, Lewis & Bockius LLP (57) ABSTRACT

A planetary gear train of an automatic transmission may include an input shaft configured to receive an engine torque, an output shaft configured to output a shifted torque, a first compound planetary gear set including first and second simple planetary gear sets having first and second sun gears, first and second planet carriers, and first and second ring gears as rotation elements, a second compound planetary gear set including third and fourth simple planetary gear sets having third and fourth sun gears, third and fourth planet carriers, and third and fourth ring gears as rotation elements, seven rotational shafts connecting to one to more rotation elements, and seven friction members including three clutches interposed between a rotational shaft and the input shaft to control the torque and four brakes selectively connecting a rotational shaft to a transmission housing.

12 Claims, 4 Drawing Sheets

|  | C1 | C2 | C3 | B1 | B2 | B3 | B4 | F1 |
|---|---|---|---|---|---|---|---|---|
| 1st | ● |  |  | ● |  |  | ● | ○ |
| 2nd | ● |  |  |  | ● |  | ● |  |
| 3rd | ● | ● |  |  |  |  | ● |  |
| 4th |  | ● |  |  | ● |  | ● |  |
| 5th |  |  | ● |  | ● |  | ● |  |
| 6th |  | ● | ● |  | ● |  |  |  |
| 7th | ● | ● | ● |  |  |  |  |  |
| 8th | ● |  | ● |  | ● |  |  |  |
| 9th | ● |  | ● | ● |  |  |  |  |
| 10th |  |  | ● | ● | ● |  |  |  |
| REV1 | ● |  |  | ● |  | ● |  |  |
| REV2 | ● |  |  |  | ● | ● |  |  |
| REV3 | ● | ● |  |  |  | ● |  |  |
| REV4 |  | ● |  |  | ● | ● |  |  |

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2011-0037384 filed in the Korean Intellectual Property Office on Apr. 21, 2011, the entire contents of which application are incorporated herein for all purposes by this reference.

BACKGROUND OF INVENTION

1. Field of Invention

The present invention relates to an automatic transmission for vehicles. More particularly, the present invention relates to a planetary gear train of an automatic transmission for vehicles which improves power delivery performance and reduces fuel consumption.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear).

In addition, the planetary gear train has different features such durability, power delivery efficiency, and size depending on the layout thereof. Therefore, designs for a combining structure of a gear train are also under continuous investigation.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and ten-speed automatic transmissions have been developed at a good pace.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a planetary gear train of an automatic transmission for vehicles having advantages of improving power delivery performance by combining a plurality of planetary gear sets with a plurality of friction members so as to firstly shift torque of an input shaft to two reduced speed ratio, a direct-coupling speed ratio, and an increased speed ratio, and to achieve final shift-speeds including at least ten forward speeds and four reverse speeds by using firstly shifted torque and the torque of the input shaft input through other path.

Exemplary planetary gear trains of an automatic transmission for vehicles according to the present invention may include: an input shaft configured to receive an engine torque; an output shaft configured to output a shifted torque; a first compound planetary gear set including a first simple planetary gear set having a first sun gear, a first planet carrier, and a first ring gear as rotation elements thereof and a second simple planetary gear set having a second sun gear, a second planet carrier, and a second ring gear as rotation elements thereof; a second compound planetary gear set including a third simple planetary gear set having a third sun gear, a third planet carrier, and a third ring gear as rotation elements thereof and a fourth simple planetary gear set having a fourth sun gear, a fourth planet carrier, and a fourth ring gear as rotation elements thereof; seven rotational shafts, connecting at least two rotation elements among the rotation elements of the first and second compound planetary gear sets or connected to one rotation element; and seven friction members including three clutches interposed between a rotational shaft selected among the rotational shafts and the input shaft so as to control the torque and four brakes selectively connecting a rotational shaft selected among the rotational shafts to a transmission housing.

Exemplary first compound planetary gear set according to the present invention may include four rotational shafts among the seven rotational shafts and may be adapted to receive the torque of the input shaft through two paths and to output four speed ratios. The four speed ratios may include two reduced speed ratios, a direct-coupling speed ratio, and an increased speed ratio.

In exemplary planetary gear trains according to the present invention, the first and second simple planetary gear sets of the first compound planetary gear set may be single pinion planetary gear sets. The first planet carrier may be directly connected to the second ring gear and the first ring gear may be directly connected to the second planet carrier in the first compound planetary gear set.

Exemplary second compound planetary gear set according to the present invention may be connected to one rotational shaft included in the first compound planetary gear set, may include three other rotational shafts not connected to the first compound planetary gear set among the seven rotational shafts, and be adapted to receive the torque input from the first compound planetary gear set and the torque of the input shaft through one path and to output ten forward speeds and four reverse speeds.

In exemplary planetary gear trains according to the present invention, the third and fourth simple planetary gear sets of the second compound planetary gear set may be single pinion planetary gear sets. The third planet carrier may be directly connected to the fourth ring gear, the third ring gear may be directly connected to the fourth planet carrier, and the third sun gear may be directly connected to the second planet carrier in the second compound planetary gear set.

In addition, in exemplary planetary gear trains according to the present invention, the seven rotational shafts may include: a first rotational shaft including the first sun gear and selectively connected to the transmission housing through a first friction member; a second rotational shaft including the first planet carrier and the second ring gear, selectively connected to the input shaft through a second friction member, and selectively connected to the transmission housing through a third friction member; a third rotational shaft including the first ring gear, the second planet carrier, and the third sun gear; a fourth rotational shaft including the second sun gear and selectively connected to the input shaft through a fourth friction member; a fifth rotational shaft including the third planet carrier and the fourth ring gear, selectively connected to the input shaft through a fifth friction member, and selectively connected to the transmission housing through a sixth friction member; a sixth rotational shaft including the third ring gear and the fourth planet carrier and connected the output shaft; and a seventh rotational shaft including the fourth sun gear and selectively connected to the transmission housing through a seventh friction member.

Moreover, in exemplary planetary gear trains according to the present invention, the friction members may include: a first clutch interposed between the input shaft and the fourth rotational shaft; a second clutch interposed between the input shaft and the second rotational shaft; a third clutch interposed between the input shaft and the fifth rotational shaft; a first brake interposed between the second rotational shaft and the transmission housing; a second brake interposed between the first rotational shaft and the transmission housing; a third brake interposed between the fifth rotational shaft and the transmission housing; and a fourth brake interposed between the seventh rotational shaft and the transmission housing.

Exemplary planetary gear trains according to the present invention may further include a one-way clutch disposed in parallel with the first brake.

Furthermore, in exemplary planetary gear trains according to the present invention, the first clutch and the first and fourth brakes are operated at a first forward speed, the first clutch and the second and fourth brakes are operated at a second forward speed, the first and second clutches and the fourth brake are operated at a third forward speed, the second clutch and the second and fourth brakes are operated at a fourth forward speed, the third clutch and the second and fourth brakes are operated at a fifth forward speed, the second and third clutches and the second brake are operated at a sixth forward speed, the first, second, and third clutches are operated at a seventh forward speed, the first and third clutches and the second brake are operate at an eighth forward speed, the first and third clutches and the first brake are operated at a ninth forward speed, the third clutch and the first and second brakes are operated at a tenth forward speed, the first clutch and the first and third brakes are operated at a first reverse speed, the first clutch and the second and third brakes are operated at a second reverse speed, the first and second clutches and the third brake are operated at a third reverse speed, and the second clutch and the second and third brakes are operated at a fourth reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiment will be omitted, and the same constituent elements are denoted by the same reference numerals in this specification. In the detailed description, numerals are used for distinguishing constituent elements having the same terms, and have no specific meanings or indicate any orders.

Figure 1:
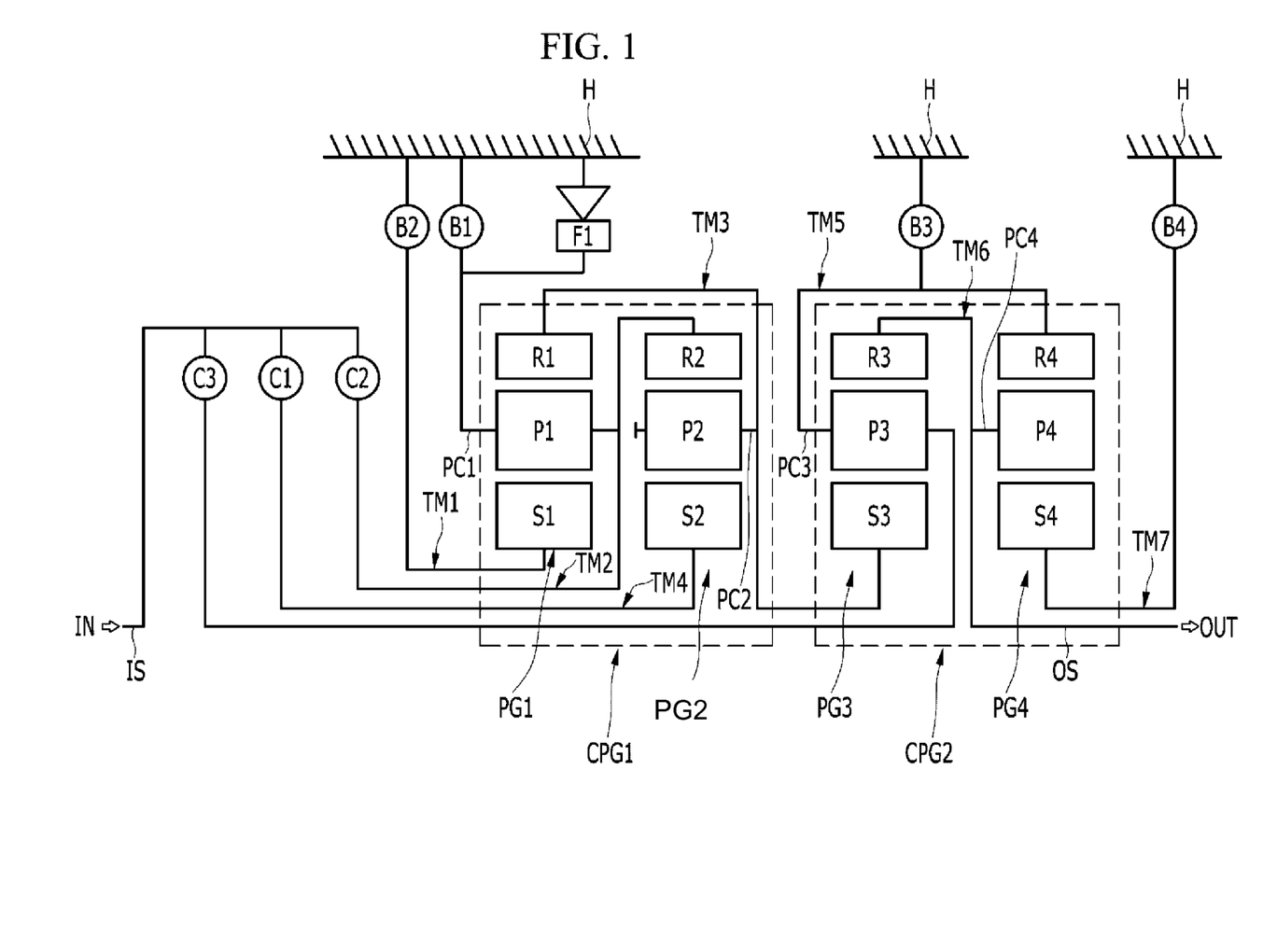
FIG. 1 is a schematic diagram of an exemplary planetary gear train according to the present invention.

Referring to FIG. 1, exemplary planetary gear trains according to the present invention may include first, second, third, and fourth simple planetary gear sets PG1, PG2, PG3, and PG4 disposed on the same axis, clutch means including three clutches C1, C2, and C3, and brake means including four brakes B1, B2, B3, and B4.

A rotation speed input from the input shaft IS is changed by the first, second, third, and fourth planetary gear sets PG1, PG2, PG3, and PG4 and is output through the output shaft OS.

In addition, the simple planetary gear sets are disposed in a sequence of the first, second, third, and fourth simple planetary gear sets PG1, PG2, PG3, and PG4 from an engine.

The input shaft IS is an input member, and torque from a crankshaft of the engine is changed through a torque converter and is input to the input shaft IS.

The output shaft OS is an output member and delivers driving torque so as to run driving wheels through a differential apparatus.

The first simple planetary gear set PG1 is a single pinion planetary gear set, and includes a first sun gear S1, a first planet carrier PC1, and a first ring gear R1 as rotation elements thereof.

Herein, the first planet carrier PC1 rotatably supports a plurality of first pinion gears P1 engaged to the first sun gear S1 and the first ring gear R1.

The second simple planetary gear set PG2 is a single pinion planetary gear set, and includes a second sun gear S2, a second planet carrier PC2, and a second ring gear R2 as rotation elements thereof.

Herein, the second planet carrier PC2 rotatably supports a plurality of second pinion gears P2 engaged to the second sun gear S2 and the second ring gear R2.

The third simple planetary gear set PG3 is a single pinion planetary gear set, and includes a third sun gear S3, a third planet carrier PC3, and a third ring gear R3 as rotation elements thereof.

Herein, the third planet carrier PC3 rotatably supports a plurality of third pinion gears P3 engaged to the third sun gear S3 and the third ring gear R3.

The fourth simple planetary gear set PG4 is a single pinion planetary gear set, and includes a fourth sun gear S4, a fourth planet carrier PC4, and a fourth ring gear R4 as rotation elements thereof.

Herein, the fourth planet carrier PC4 rotatably supports a plurality of fourth pinion gears P4 engaged to the fourth sun gear S4 and the fourth ring gear R4.

In addition, the first, second, third, and fourth simple planetary gear sets PG1, PG2, PG3, and PG4 form two compound planetary gear sets CPG1 and CPG2, change the torque transmitted from the input shaft into ten forward speeds, and output the ten forward speeds.

The first compound planetary gear set CPG1 includes the first and second simple planetary gear sets PG1 and PG2, and the second compound planetary gear set CPG2 includes the third and fourth simple planetary gear sets PG3 and PG4.

Figure 2:
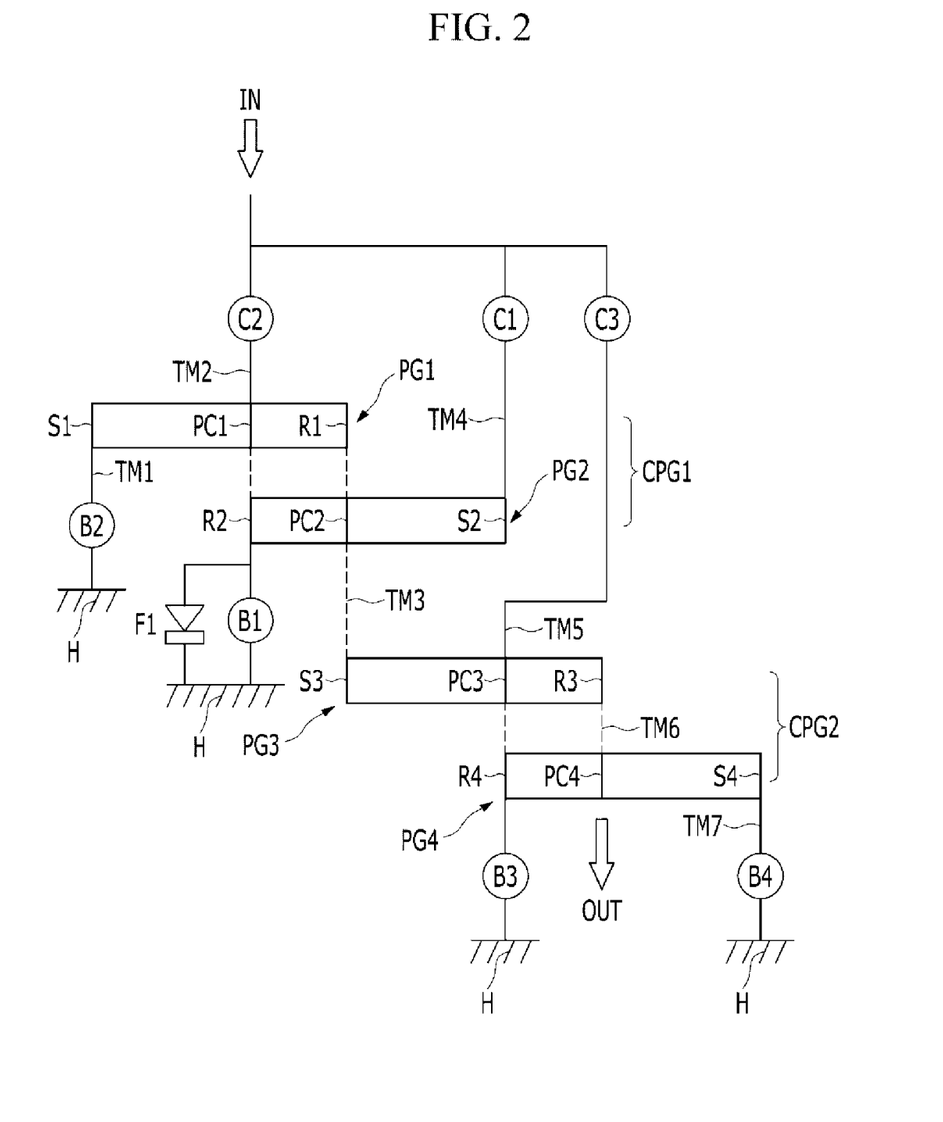
FIG. 2 shows connections in an exemplary planetary gear train according to the present invention.

Referring to FIG. 1 and FIG. 2, the first planet carrier PC1 is directly connected to the second ring gear R2 and the first ring gear R1 is directly connected to the second planet carrier PC2 in the first compound planetary gear set CPG1.

In addition, the third planet carrier PC3 is directly connected to the fourth ring gear R4, the third ring gear R3 is directly connected to the fourth planet carrier PC4, and the third sun gear S3 is directly connected to the second planet carrier PC2 in the second compound planetary gear set CPG2.

Accordingly, the planetary gear train according to various embodiments includes seven rotational shafts TM1-TM7.

The first rotational shaft TM1 includes the first sun gear S1 and is selectively connected to a transmission housing H.

The second rotational shaft TM2 includes the first planet carrier PC1 and the second ring gear R2, is selectively connected to the input shaft IS, and is selectively connected to the transmission housing H.

The third rotational shaft TM3 includes the first ring gear R1, the second planet carrier PC2, and the third sun gear S3.

The fourth rotational shaft TM4 includes the second sun gear S2 and is selectively connected to the input shaft IS.

The fifth rotational shaft TM5 includes the third planet carrier PC3 and the fourth ring gear R4, is selectively connected to the input shaft IS, and is selectively connected to the transmission housing H.

The sixth rotational shaft TM6 includes the third ring gear R3 and the fourth planet carrier PC4 and is directly connected to the output shaft OS.

The seventh rotational shaft TM7 includes the fourth sun gear S4 and is selectively connected to the transmission housing H.

In addition, the fourth, second, and fifth rotational shafts TM4, TM2, and TM5 among the rotational shafts TM1-TM7 selectively connected to the input shaft IS and operated as a selective input member are connected to the input shaft IS respectively through first, second, and third clutches C1, C2, and C3.

In addition, the second, first, fifth, and seventh rotational shafts TM2, TM1, TM5, and TM7 among the rotational shafts TM1-TM7 selectively connected to the transmission housing H and operated as a selective fixed member are connected to the transmission housing H through first, second, third, and fourth brakes B1, B2, B3, and B4.

That is, the first clutch C1 is interposed between the input shaft IS and the fourth rotational shaft TM4 so as to operate the fourth rotational shaft TM4 as the selective input element.

The second clutch C2 is interposed between the input shaft IS and the second rotational shaft TM2 so as to operate the second rotational shaft TM2 as the selective input element.

The third clutch C3 is interposed between the input shaft IS and the fifth rotational shaft TM5 so as to operate the fifth rotational shaft TM5 as the selective input element.

The first brake B1 is interposed between the second rotational shaft TM2 and the transmission housing H so as to operate the second rotational shaft TM2 as the selective fixed element.

In addition, a one-way clutch F1 disposed in parallel with the first brake B1 is further included between the second rotational shaft TM2 and the transmission housing H.

The second brake B2 is interposed between the first rotational shaft TM1 and the transmission housing H so as to operate the first rotational shaft TM1 as the selective fixed element.

The third brake B3 is interposed between the fifth rotational shaft TM5 and the transmission housing H so as to operate the fifth rotational shaft TM5 as the selective fixed element.

The fourth brake B4 is interposed between the seventh rotational shaft TM7 and the transmission housing H so as to operate the seventh rotational shaft TM7 as the selective fixed element.

The first and second clutches C1 and C2 and the first and second brakes B1 and B2 are applied to the first compound planetary gear set CPG1, and the torque input through the first and second clutches C1 and C2 is changed into four speed ratios according to operations of the first and second brakes B1 and B2.

At this time, the four speed ratios include two reduced speed ratios, one direct-coupling speed ratio, and one increased speed ratio.

In addition, the third clutch C3 and the third and fourth brakes B3 and B4 are applied to the second compound planetary gear set CPG2, and the torque directly input from the input shaft IS through the third clutch C3 and the torque changed into four speed ratios and input from the first compound planetary gear set CPG2 are changed into ten forward speeds and four reverse speeds by operations of the third and fourth brakes B3 and 84.

Friction members including the first, second, and third clutches C1, C2, and C3 and the first, second, third, and fourth brakes B1, B2, B3, and B4 are conventional multi-plate friction elements of wet type that are operated by hydraulic pressure.

The numbers of planetary gear sets, forward speeds, reverse speeds, rotational shafts, speed ratios, clutches, brakes and etc. described in the application are exemplary. One skilled in the art would appreciate that the present invention is not limited to these exemplary numbers, and specific number for each group may vary.

Figure 3:
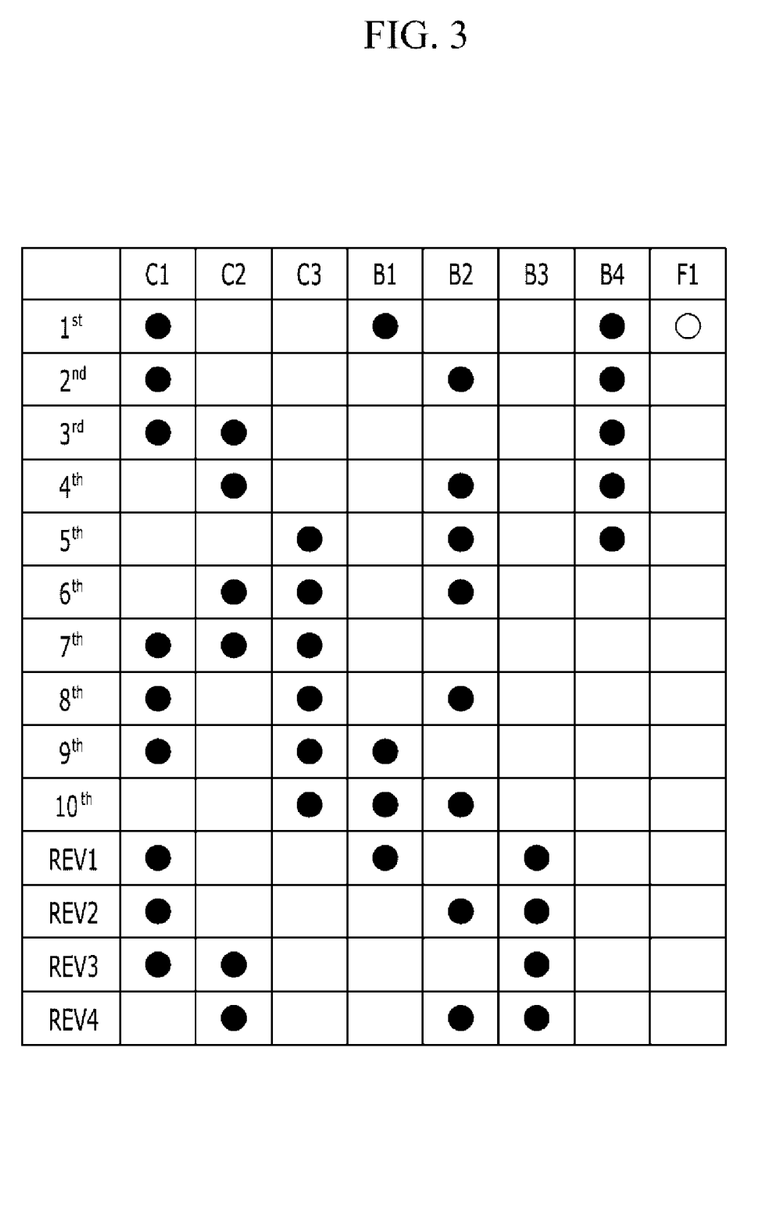
FIG. 3 is an operational chart of friction members at each shift-speed applied to an exemplary planetary gear train according to the present invention.

FIG. 3 is an operational chart of friction members at each shift-speed applied to an exemplary planetary gear train according to the present invention. Referring to FIG. 3, seven friction members, including three clutches C1, C2, and C3 and four brakes B1, B2, B3, and B4, are selectively operated at each shift-speed. According to various embodiments, three friction members are operated at each shift-speed.

At a first forward speed, the first clutch C1 and the first and fourth brakes B1 and B4 are operated.

The first clutch C1 and the second and fourth brakes B2 and B4 are operated at a second forward speed, and the first and second clutches C1 and C2 and the fourth brake B4 are operated at a third forward speed.

The second clutch C2 and the second and fourth brakes B2 and B4 are operated at a fourth forward speed, and the third clutch C3 and the second and fourth brakes B2 and B4 are operated at a fifth forward speed.

The second and third clutches C2 and C3 and the second brake B2 are operated at a sixth forward speed, and the first, second, and third clutches C1, C2, and C3 are operated at a seventh forward speed.

The first and third clutches C1 and C3 and the second brake B2 are operated at an eighth forward speed, and the first and third clutches C1 and C3 and the first brake B1 are operated at a ninth forward speed.

The third clutch C3 and the first and second brakes B1 and B2 are operated at a tenth forward speed, and the first clutch C1 and the first and third brakes B1 and B3 are operated at a first reverse speed.

The first clutch C1 and the second and third brakes B2 and B3 are operated at a second reverse speed, and the first and second clutches C1 and C2 and the third brake B3 are operated at a third reverse speed. In addition, the second clutch C2 and the second and third brakes B2 and B3 are operated at a fourth reverse speed.

It is explained that the first clutch C1 and the first and fourth brakes B1 and B4 are operated at the first forward speed, but the one-way clutch F1 instead of the first brake B1 is operated at a normal driving.

Figure 4:
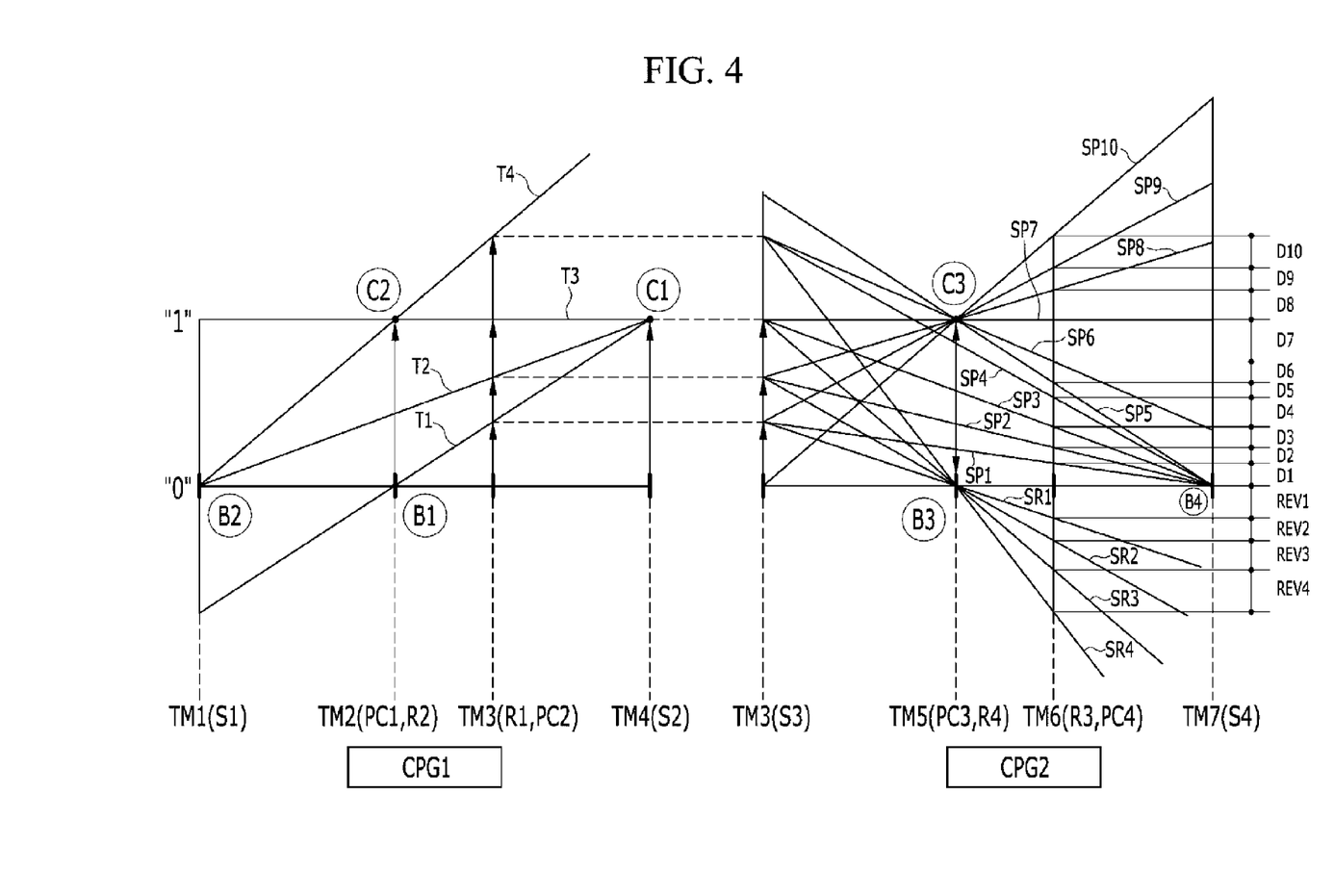
FIG. 4 is a lever diagram for an exemplary planetary gear train according to the present invention.

FIG. 4 is a lever diagram for an exemplary planetary gear train according to the present invention and shows shifting processes of the exemplary planetary gear train according to the present invention.

Referring to FIG. 4, a lower horizontal line represents a rotation speed is "0", and an upper horizontal line represents a rotation speed is "1.0", that is, the rotation speed thereof is the same as that of the input shaft IS.

Four vertical lines of the first compound planetary gear set CPG1 sequentially represent the first, second, third, and fourth rotational shafts TM1, TM2, TM3, and TM4 from the left to the right.

Herein, distances between the first, second, third, and fourth rotational shafts TM1, TM2, TM3, and TM4 are set according to gear ratios (teeth number of the sun gear/teeth number of the ring gear) of the first and second simple planetary gear sets PG1 and PG2.

Four vertical lines of the second compound planetary gear set CPG2 sequentially represent the third, fifth, sixth, and seventh rotational shafts TM3, TM5, TM6, and TM7 from the left to the right.

Herein, distances between the third, fifth, sixth, and seventh rotational shafts TM3, TM5, TM6, and TM7 are set according to gear ratios (teeth number of the sun gear/teeth number of the ring gear) of the third and fourth simple planetary gear sets PG3 and PG4.

The reason why the third rotational shaft TM3 is included in both the first compound planetary gear set CPG1 and the second compound planetary gear set CPG2 is that the third rotational shaft TM3 is integrally formed with the first ring gear R1, the second planet carrier PC2, and the third sun gear S3.

Referring to FIG. 3 and FIG. 4, shifting processes for each shift-speed in the planetary gear train according to various embodiments will be described.

First Forward Speed

Referring to FIG. 3, the first clutch C1 and the first and fourth brakes B1 and B4 are operated at the first forward speed.

As shown in FIG. 4, in a state that the rotation speed of the input shaft IS is input to the fourth rotational shaft TM4 by operation of the first clutch C1, the second rotational shaft TM2 is operated as the fixed element by operation of the first brake B1 in the first compound planetary gear set CPG1.

Accordingly, the first compound planetary gear set CPG1 forms a first reduced speed line T1 and a first reduced speed is output through the third rotational shaft TM3.

In addition, in a state that the rotation speed of the third rotational shaft TM3 is input to the second compound planetary gear set CPG2, the seventh rotational shaft TM7 is operated as the fixed element by operation of the fourth brake B4 such that a first shift line SP1 is formed.

The first shift line SP1 crosses a vertical line of the sixth rotational shaft TM6 that is the output element such that D1 is output.

Second Forward Speed

The first brake B1 that was operated at the first forward speed is released and the second brake B2 is operated at the second forward speed.

In a state that the rotation speed of the input shaft IS is input to the fourth rotational shaft TM4 by operation of the first clutch C1, the first rotational shaft TM1 is operated as the fixed element by operation of the second brake B2 in the first compound planetary gear set CPG1.

Accordingly, the first compound planetary gear set CPG1 forms a second reduced speed line T2 and a second reduced speed is output through the third rotational shaft TM3.

In addition, in a state that the rotation speed of the third rotational shaft TM3 is input to the second compound planetary gear set CPG2, the seventh rotational shaft TM7 is operated as the fixed element by operation of the fourth brake B4 such that a second shift line SP2 is formed.

The second shift line SP2 crosses the vertical line of the sixth rotational shaft TM6 that is the output element such that D2 is output.

Third Forward Speed

The second brake B2 that was operated at the second forward speed is released and the second clutch C2 is operated at the third forward speed.

The rotation speed of the input shaft IS is simultaneously input to the second and fourth rotational shafts TM2 and TM4 by operations of the first and second clutches C1 and C2 in the first compound planetary gear set CPG1, and the first compound planetary gear set CPG1 becomes a direct-coupling state. Therefore, the first compound planetary gear set CPG1 forms a direct-coupling speed line T3 and the rotation speed of the input shaft IS is output through the third rotational shaft TM3.

In addition, in a state that the rotation speed of the third rotational shaft TM3 is input to the second compound planetary gear set CPG2, the seventh rotational shaft TM7 is operated as the fixed element by operation of the fourth brake B4 such that a third shift line SP3 is formed.

The third shift line SP3 crosses the vertical line of the sixth rotational shaft TM6 that is the output element such that D3 is output.

Fourth Forward Speed

The first clutch C1 that was operated at the third forward speed is released and the second brake B2 is operated at the fourth forward speed.

In a state that the rotation speed of the input shaft IS is input to the second rotational shaft TM2 by operation of the second clutch C2, the first rotational shaft TM1 is operated as the fixed element by operation of the second brake B2 in the first compound planetary gear set CPG1.

Accordingly, the first compound planetary gear set CPG1 forms an increased speed line T4 and an increased speed is output through the third rotational shaft TM3.

In addition, in a state that the rotation speed of the third rotational shaft TM3 is input to the second compound planetary gear set CPG2, the seventh rotational shaft TM7 is operated as the fixed element by operation of the fourth brake B4 such that a fourth shift line SP4 is formed.

The fourth shift line SP4 crosses the vertical line of the sixth rotational shaft TM6 that is the output element such that D4 is output.

Fifth Forward Speed

The second clutch C2 that was operated at the fourth forward speed is released and the third clutch C3 is operated at the fifth forward speed.

Since the first and second clutches C1 and C2 are not operated, the first compound planetary gear set CPG1 does not influence on the shifting.

In a state that the rotation speed of the input shaft IS is input to the second compound planetary gear set CPG2 through the fifth rotational shaft TM5 by operation of the third clutch C3, the seventh rotational shaft TM7 is operated as the fixed element by operation of the fourth brake B4 such that a fifth shift line SP5 is formed.

The fifth shift line SP5 crosses the vertical line of the sixth rotational shaft TM6 that is the output element such that D5 is output.

Sixth Forward Speed

The fourth brake B4 that was operated at the fifth forward speed is released and the second clutch C2 is operated at the sixth forward speed.

In a state that the rotation speed of the input shaft IS is input to the second rotational shaft TM2 by operation of the second clutch C2, the first rotational shaft TM1 is operated as the fixed element by operation of the second brake B2 in the first compound planetary gear set CPG1.

Accordingly, the first compound planetary gear set CPG1 forms an increased speed line T4 and an increased speed is output through the third rotational shaft TM3.

In addition, in a state that the rotation speed of the third rotational shaft TM3 is input to the second compound planetary gear set CPG2, the rotation speed of the input shaft IS is input to the fifth rotational shaft TM5 by operation of the third clutch C3 such that a sixth shift line SP6 is formed.

The sixth shift line SP6 crosses the vertical line of the sixth rotational shaft TM6 that is the output element such that D6 is output.

Seventh Forward Speed

The second brake B2 that was operated at the sixth forward speed is released and the first clutch C1 is operated at the seventh forward speed.

The rotation speed of the input shaft IS is simultaneously input to the second and fourth rotational shafts TM2 and TM4 by operations of the first and second clutches C1 and C2 in the first compound planetary gear set CPG1, and the first compound planetary gear set CPG1 becomes a direct-coupling state.

Therefore, the first compound planetary gear set CPG1 forms a direct-coupling speed line T3 and the rotation speed of the input shaft IS is output through the third rotational shaft TM3.

In addition, in a state that the rotation speed of the third rotational shaft TM3 is input to the second compound planetary gear set CPG2, the rotation speed of the input shaft IS is input to the fifth rotational shaft TM5 by operation of the third clutch C3 such that the second compound planetary gear set CPG2 becomes the direct-coupling state and a seventh shift line SP7 is formed.

The seventh shift line SP7 crosses the vertical line of the sixth rotational shaft TM6 that is the output element such that D7 is output.

Eighth Forward Speed

The second clutch C2 that was operated at the seventh forward speed is released and the second brake B2 is operated at the eighth forward speed.

In a state that the rotation speed of the input shaft IS is input to the fourth rotational shaft TM4 by operation of the first clutch C1, the first rotational shaft TM1 is operated as the fixed element by operation of the second brake B2 in the first compound planetary gear set CPG1.

Accordingly, the first compound planetary gear set CPG1 forms a second reduced speed line T2 and a second reduced speed is output through the third rotational shaft TM3.

In addition, in a state that the rotation speed of the third rotational shaft TM3 is input to the second compound planetary gear set CPG2, the rotation speed of the input shaft IS is input to the fifth rotational shaft TM5 by operation of the third clutch C3 such that an eighth shift line SP8 is formed.

The eighth shift line SP8 crosses the vertical line of the sixth rotational shaft TM6 that is the output element such that D8 is output.

Ninth Forward Speed

The second brake B2 that was operated at the eighth forward speed is released and the first brake B1 is operated at the ninth forward speed.

In a state that the rotation speed of the input shaft IS is input to the fourth rotational shaft TM4 by operation of the first clutch C1, the second rotational shaft TM2 is operated as the fixed element by operation of the first brake B1 in the first compound planetary gear set CPG1.

Accordingly, the first compound planetary gear set CPG1 forms a first reduced speed line T1 and a first reduced speed is output through the third rotational shaft TM3.

In addition, in a state that the rotation speed of the third rotational shaft TM3 is input to the second compound planetary gear set CPG2, the rotation speed of the input shaft IS is input to the fifth rotational shaft TM5 by operation of the third clutch C3 such that a ninth shift line SP9 is formed.

The ninth shift line SP9 crosses the vertical line of the sixth rotational shaft TM6 that is the output element such that D9 is output.

Tenth Forward Speed

The first clutch C1 that was operated at the ninth forward speed is released and the second brake B2 is operated at the tenth forward speed.

The first compound planetary gear set CPG1 is stopped because the first and second brakes B1 and B2 are operated in a state that the first and second clutches C1 and C2 are not operated.

In a state that the rotation speed of the input shaft IS is input to the second compound planetary gear set CPG2 through the fifth rotational shaft TM5 by operation of the third clutch C3, the third rotational shaft TM3 is operated as the fixed element by the stopping state of the first compound planetary gear set CPG1 such that a tenth shift line SP10 is formed.

The tenth shift line SP10 crosses the vertical line of the sixth rotational shaft TM6 that is the output element such that D10 is output.

First Reverse Speed

The first clutch C1 and the first and third brakes B1 and B3 are operated at the first reverse speed.

In a state that the rotation speed of the input shaft IS is input to the fourth rotational shaft TM4 by operation of the first clutch C1, the second rotational shaft TM2 is operated as the fixed element by operation of the first brake B1 in the first compound planetary gear set CPG1.

Accordingly, the first compound planetary gear set CPG1 forms a first reduced speed line T1 and a first reduced speed is output through the third rotational shaft TM3.

In addition, in a state that the rotation speed of the third rotational shaft TM3 is input to the second compound planetary gear set CPG2, the fifth rotational shaft TM5 is operated as the fixed element by operation of the third brake B3 such that a first reverse shift line SR1 is formed.

The first reverse shift line SR1 crosses the vertical line of the sixth rotational shaft TM6 that is the output element such that REV1 is output.

Second Reverse Speed

The first brake B1 that was operated at the first reverse speed is released and the second brake B2 is operated at the second reverse speed.

In a state that the rotation speed of the input shaft IS is input to the fourth rotational shaft TM4 by operation of the first clutch C1, the first rotational shaft TM1 is operated as the fixed element by operation of the second brake B2 in the first compound planetary gear set CPG1.

Accordingly, the first compound planetary gear set CPG1 forms a second reduced speed line T2 and a second reduced speed is output through the third rotational shaft TM3.

In addition, in a state that the rotation speed of the third rotational shaft TM3 is input to the second compound planetary gear set CPG2, the fifth rotational shaft TM5 is operated as the fixed element by operation of the third brake B3 such that a second reverse shift line SR2 is formed.

The second reverse shift line SR2 crosses the vertical line of the sixth rotational shaft TM6 that is the output element such that a REV2 is output.

Third Reverse Speed

The second brake B2 that was operated at the second reverse speed is released and the second clutch C2 is operated at the third reverse speed.

The rotation speed of the input shaft IS is simultaneously input to the second and fourth rotational shafts TM2 and TM4 by operations of the first and second clutches C1 and C2 in the first compound planetary gear set CPG1, and the first compound planetary gear set CPG1 becomes a direct-coupling state. Therefore, the first compound planetary gear set CPG1 forms a direct-coupling speed line T3 and the rotation speed of the input shaft IS is output through the third rotational shaft TM3.

In addition, in a state that the rotation speed of the third rotational shaft TM3 is input to the second compound planetary gear set CPG2, the fifth rotational shaft TM5 is operated as the fixed element by operation of the third brake B3 such that a third reverse shift line SR3 is formed.

The third reverse shift line SR3 crosses the vertical line of the sixth rotational shaft TM6 that is the output element such that a REV3 is output.

Fourth Reverse Speed

In a state that the rotation speed of the input shaft IS is input to the second rotational shaft TM2 by operation of the second clutch C2, the first rotational shaft TM1 is operated as the fixed element by operation of the second brake B2 in the first compound planetary gear set CPG1.

Accordingly, the first compound planetary gear set CPG1 forms an increased speed line T4 and an increased speed is output through the third rotational shaft TM3.

In addition, in a state that the rotation speed of the third rotational shaft TM3 is input to the second compound planetary gear set CPG2, the fifth rotational shaft TM5 is operated as the fixed element by operation of the third brake B3 such that a fourth reverse shift line SR4 is formed.

The fourth reverse shift line SR4 crosses the vertical line of the sixth rotational shaft TM6 that is the output element such that a REV4 is output.

Since four simple planetary gear sets is combined with seven friction members and three friction members are operated at each shift-speed according various embodiments of the present invention, ten forward speeds are achieved. Therefore, power delivery performance and fuel economy may be improved.

In addition, since four reverse speeds are achieved, reverse speed performance may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
    an input shaft configured to receive an engine torque;
    an output shaft configured to output a shifted torque;
    a first compound planetary gear set including a first simple planetary gear set having a first sun gear, a first planet carrier, and a first ring gear as rotation elements thereof and a second simple planetary gear set having a second sun gear, a second planet carrier, and a second ring gear as rotation elements thereof;
    a second compound planetary gear set including a third simple planetary gear set having a third sun gear, a third planet carrier, and a third ring gear as rotation elements thereof and a fourth simple planetary gear set having a fourth sun gear, a fourth planet carrier and a fourth ring gear as rotation elements thereof;
    seven rotational shafts each connecting to one or more rotation elements among the rotation elements of the first and second compound planetary gear sets; and
    seven friction members including three clutches each interposed between a rotational shaft selected among the rotational shafts and the input shaft so as to control torques and four brakes each selectively connecting a rotational shaft selected among the rotational shafts to a transmission housing;
    wherein the first compound planetary gear set includes four rotational shafts among the seven rotational shafts and is adapted to receive a torque of the input shaft through two paths and to output four speed ratios; and
    wherein the second compound planetary gear set is connected to one of the four rotational shafts in the first compound planetary gear set and includes three other rotational shafts which are not included in the first compound planetary gear set, and the second compound planetary gear set is adapted to receive a torque from the first compound planetary gear set and the torque of the input shaft through one of the two paths and to output ten forward speeds and four reverse speeds.

2. The planetary gear train of claim 1, wherein the four speed ratios include two reduced speed ratios, a direct-coupling speed ratio, and an increased speed ratio.

3. The planetary gear train of claim 1, wherein the first and second simple planetary gear sets of the first compound planetary gear set are single pinion planetary gear sets.

4. The planetary gear train of claim 1, wherein the first planet carrier is directly connected to the second ring gear and the first ring gear is directly connected to the second planet carrier in the first compound planetary gear set.

5. The planetary gear train of claim 1, wherein the third and fourth simple planetary gear sets of the second compound planetary gear set are single pinion planetary gear sets.

6. The planetary gear train of claim 1, wherein the third planet carrier is directly connected to the fourth ring gear, the third ring gear is directly connected to the fourth planet carrier, and the third sun gear is directly connected to the second planet carrier in the second compound planetary gear set.

7. The planetary gear train of claim 1, wherein the first and second simple planetary gear sets of the first compound planetary gear set and the third and fourth simple planetary gear sets of the second compound planetary gear set are single pinion planetary gear sets.

8. The planetary gear train of claim 1, wherein
the first planet carrier is directly connected to the second ring gear and the first ring gear is directly connected to the second planet carrier in the first compound planetary gear set; and
the third planet carrier is directly connected to the fourth ring gear, the third ring gear is directly connected to the fourth planet carrier, and the third sun gear is directly connected to the second planet carrier in the second compound planetary gear set.

9. The planetary gear train of claim 1, wherein the seven rotational shafts comprises:
a first rotational shaft including the first sun gear and selectively connected to the transmission housing through a first friction member;
a second rotational shaft including the first planet carrier and the second ring gear, selectively connected to the input shaft through a second friction member, and selectively connected to the transmission housing through a third friction member;
a third rotational shaft including the first ring gear, the second planet carrier, and the third sun gear;
a fourth rotational shaft including the second sun gear and selectively connected to the input shaft through a fourth friction member;
a fifth rotational shaft including the third planet carrier and the fourth ring gear, selectively connected to the input shaft through a fifth friction member, and selectively connected to the transmission housing through a sixth friction member;
a sixth rotational shaft including the third ring gear and the fourth planet carrier and connected the output shaft; and
a seventh rotational shaft including the fourth sun gear and selectively connected to the transmission housing through a seventh friction member.

10. The planetary gear train of claim 9, wherein the friction members comprises:
a first clutch interposed between the input shaft and the fourth rotational shaft;
a second clutch interposed between the input shaft and the second rotational shaft;
a third clutch interposed between the input shaft and the fifth rotational shaft;
a first brake interposed between the second rotational shaft and the transmission housing;
a second brake interposed between the first rotational shaft and the transmission housing;
a third brake interposed between the fifth rotational shaft and the transmission housing; and
a fourth brake interposed between the seventh rotational shaft and the transmission housing.

11. The planetary gear train of claim 10, further comprising a one-way clutch disposed in parallel with the first brake.

12. The planetary gear train of claim 10, wherein the first clutch and the first and fourth brakes are operated at a first forward speed,
the first clutch and the second and fourth brakes are operated at a second forward speed,
the first and second clutches and the fourth brake are operated at a third forward speed,
the second clutch and the second and fourth brakes are operated at a fourth forward speed,
the third clutch and the second and fourth brakes are operated at a fifth forward speed,
the second and third clutches and the second brake are operated at a sixth forward speed,
the first, second, and third clutches are operated at a seventh forward speed,
the first and third clutches and the second brake are operate at an eighth forward speed,
the first and third clutches and the first brake are operated at a ninth forward speed,
the third clutch and the first and second brakes are operated at a tenth forward speed,
the first clutch and the first and third brakes are operated at a first reverse speed,
the first clutch and the second and third brakes are operated at a second reverse speed,
the first and second clutches and the third brake are operated at a third reverse speed, and
the second clutch and the second and third brakes are operated at a fourth reverse speed.

* * * * *